(12) United States Patent
Nakajima et al.

(10) Patent No.: US 6,836,561 B2
(45) Date of Patent: Dec. 28, 2004

(54) METHOD AND SYSTEM FOR DETECTING A DEFECT IN PROJECTED PORTIONS OF AN OBJECT HAVING THE PROJECTED PORTIONS FORMED IN THE SAME SHAPE WITH A PREDETERMINED PITCH ALONG AN ARC

(75) Inventors: Tsuyoshi Nakajima, Shizuoka (JP); Masami Takeshi, Shizuoka (JP); Naoya Murota, Shizuoka (JP); Yutaka Miyahara, Shizuoka (JP)

(73) Assignee: Suzuki Motor Corporation, Shizuoka (JP)

(*) Notice: Subject to any disclaimer, the term of this patent is extended or adjusted under 35 U.S.C. 154(b) by 630 days.

(21) Appl. No.: 09/854,607

(22) Filed: May 15, 2001

(65) Prior Publication Data

US 2001/0043736 A1 Nov. 22, 2001

(30) Foreign Application Priority Data

May 22, 2000 (JP) .......................................... 2000-149546

(51) Int. Cl.$^7$ ............................. G06K 9/00; G06E 19/00
(52) U.S. Cl. ......................................... 382/152; 702/34
(58) Field of Search ................................ 382/141–152, 382/199, 203, 286; 345/441–442; 348/92, 128, 135; 356/241.5, 241.6, 628, 629; 702/34, 40, 156; 250/559.39, 559.45, 559.48

(56) References Cited

U.S. PATENT DOCUMENTS

| | | | | |
|---|---|---|---|---|
| 5,237,649 A | * | 8/1993 | Yamada | 345/442 |
| 5,345,514 A | * | 9/1994 | Mahdavieh et al. | 382/152 |
| 5,493,123 A | * | 2/1996 | Knollenberg et al. | 250/372 |
| 5,808,744 A | * | 9/1998 | Moriya | 356/394 |
| 6,134,342 A | * | 10/2000 | Doke et al. | 382/141 |
| 6,400,454 B1 | * | 6/2002 | Noguchi et al. | 356/237.3 |
| 6,510,239 B1 | * | 1/2003 | Wieres et al. | 382/141 |
| 6,603,873 B1 | * | 8/2003 | Gordon et al. | 382/144 |

FOREIGN PATENT DOCUMENTS

| | | | | |
|---|---|---|---|---|
| EP | 0704172 | | 4/1996 | |
| EP | 0791822 | | 8/1997 | |
| JP | 10206147 A | * | 8/1998 | G01B/21/20 |
| JP | 2000065749 A | * | 3/2000 | G01N/21/88 |

* cited by examiner

Primary Examiner—Bhavesh M. Metha
Assistant Examiner—Yubin Hung
(74) Attorney, Agent, or Firm—Greenblum & Bernstein P.L.C.

(57) ABSTRACT

A defect detection method and system which can provide a precise determination of whether an object is acceptable without being affected by the position of placement and the rotational orientation of the object. An arc circumscribing the tip of modules of a sprocket is determined. Then, each overlapping region is extracted which is formed by an overlapping portion between an inner portion of a region defined by the arc and the cut-away portion of the sprocket. The area of each overlapping region is determined and compared with each other. In accordance with a determination of whether each area difference falls within the predetermined range of criteria $\epsilon$, it is determined whether a chipped portion exists on the tip of module. If there is a chipped portion on the tip of module, two or more overlapping regions are integrated with each other to form a larger overlapping region, thereby making it possible to determine easily and positively the presence of a chipped portion on the tip of module.

8 Claims, 9 Drawing Sheets

PRIOR ART

PRIOR ART

FIG.9(a)

IMAGE OF A GOOD OBJECT

FIG.9(b)

IMAGE OF A DEFECTIVE OBJECT

CALCULATION OF THE DIFFERENCE BETWEEN THE IMAGES

FIG.9(c)

DEFECT

EXTRACTION OF A DEFECT

METHOD AND SYSTEM FOR DETECTING A DEFECT IN PROJECTED PORTIONS OF AN OBJECT HAVING THE PROJECTED PORTIONS FORMED IN THE SAME SHAPE WITH A PREDETERMINED PITCH ALONG AN ARC

BACKGROUND OF THE INVENTION

1. Field of the Invention

The present invention relates to methods and apparatuses for detecting defects in an object having projected portions formed in the same shape with a predetermined pitch along an arc, the object including, for example, an external gear, an internal gear, a sprocket, or a mechanical element having projected portions equivalent to those modules along part of an arc. More particularly, the present invention relates to a method and apparatus preferably used for detecting a chipped portion in an object such as castings or sintered products, on the tip of the projected portion of which a defect or flaw may be easily formed.

2. Description of the Related Art

Known as a defect detection method and apparatus of this type is such that the reference image data of a good object is predetermined and then the image data of an inspected object is compared with the reference data to thereby determine if a rejectable defect exists on the object.

Now, a conventional defect detection method and apparatus of this type will be briefly explained below with reference to the conceptual view of a processing procedure shown in FIG. 8 and the view of the processing principle shown in FIG. 9.

Figure 8:
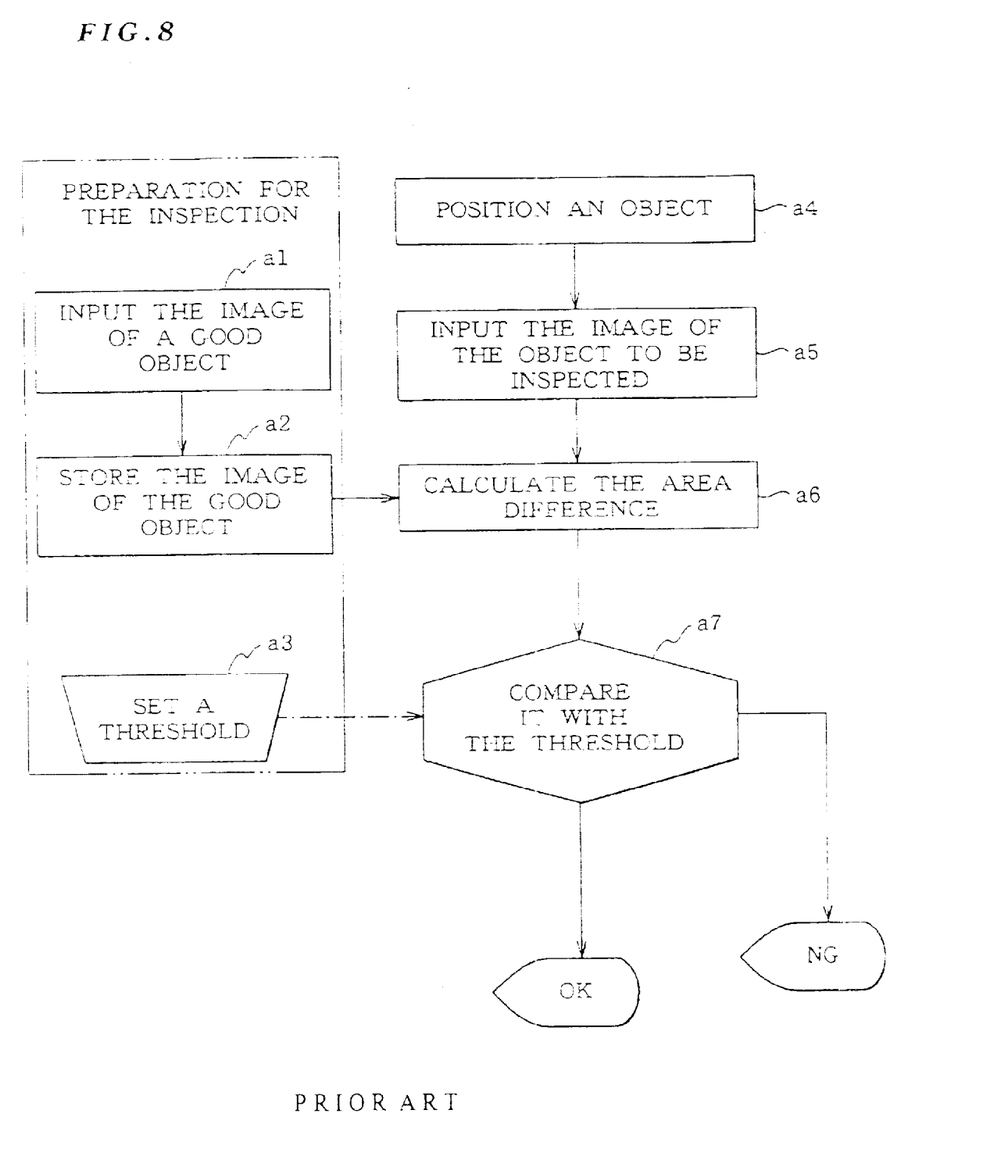
FIG. 8 is a schematic conceptual view showing the processing procedure of a prior art defect detection method and system.
Figure 9A:
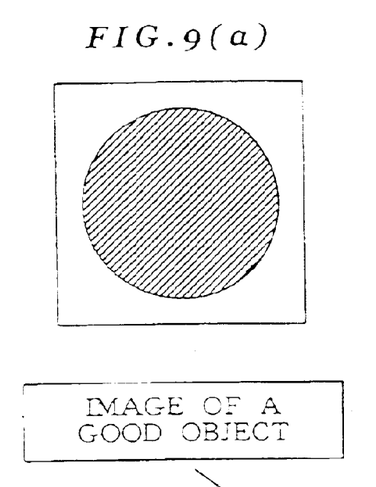
FIGS. 9(a), (b), and (c) are schematic conceptual views showing the operation principle of the prior art defect detection method and system.
Figure 9B:
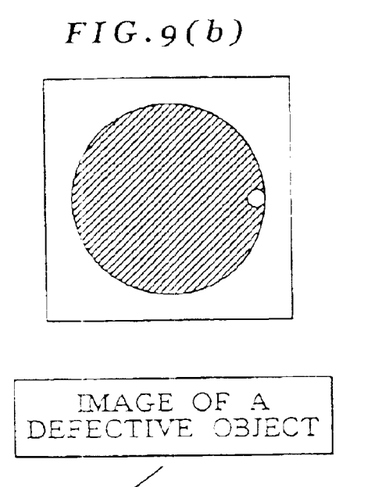
Figure 9C:
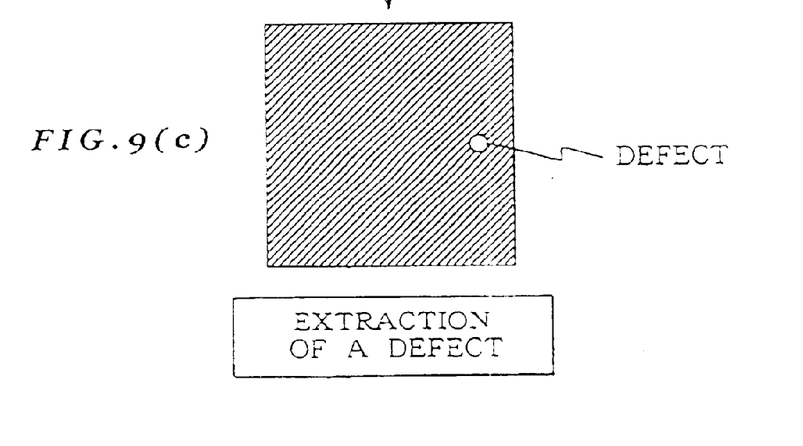

In the conventional defect detection method and apparatus, first, as the pre-processing for the actual inspection of a defect, an object having a proper shape with no defect is positioned in place and then the image data of the object is obtained as shown in FIG. 9(a) (step a1 of FIG. 8).

Subsequently, the image data is stored in an image processing apparatus or the like as the reference image data for determining if a defect exists on an inspected object (step a2 of FIG. 8). As shown in FIG. 9(a), the frame of image data contains information on the position of the object, that is, information as to where the object is placed in the view field of the camera. More specifically, this positional information represents addresses in a frame memory.

In addition, in this pre-processing step, an operator manually inputs criteria such as allowable errors in dimension or shape of the object for determining that the object is acceptable, considering the properties of the object such as the shape, size or the like (step a3 of FIG. 8). Excessively exacting tolerances would provide excessively tightened GO/NO-GO criteria, whereas loosely determined tolerances would provide inaccurate GO/NO-GO criteria.

Upon inspection of a newly manufactured object, the object to be inspected is placed in the same position as that of the good object placed to prepare the reference image data mentioned above (step a4 of FIG. 8). Then, a frame of image data of the inspected object is obtained in the same manner as described above as shown in FIG. 9(b) (step a5 of FIG. 8). Incidentally, as shown in FIG. 9(b), it should be understood that the inspected object is supposed to have a defect on its circumference portion in its image frame, with a portion corresponding to the defect being indicated qualitatively with a hollow circle.

Then, the image data registered beforehand as described above, or the reference for a determination of whether the object is acceptable, is read into the image processing apparatus, and thereafter the reference image data and the currently captured image data of the inspected object are compared with each other to output the difference therebetween (step a6 of FIG. 8). In practice, the two frames of image data are compared bit by bit with each other in the frame memory of the image processing apparatus to output the portions having inconsistencies in density. Accordingly, the difference between the reference data of FIG. 9(a) and the inspection data of FIG. 9(b) can be outputted qualitatively in the form of a hollow circle as shown in FIG. 9(c).

In other words, the size of the area of the circle indicates the degree of inconsistency in density between the two, with a smaller area indicating a less degree of inconsistency and a larger area indicating a higher degree of inconsistency.

Thus, it is finally determined that the inspected object is acceptable if the degree of inconsistency or the output level of difference does not exceed the aforementioned criteria but determined that the object is rejectable if the output level of difference exceeds the criteria (step a7 of FIG. 8).

However, as described above, the frames of image data of FIGS. 9(a) and 9(b) contain information regarding the position of the object in s frame. If the object is not properly positioned in place upon preparation of reference image data or inspection of the object, this would provide an increased output level of difference due to a shift in position and thereby result in determining that the object is rejectable even if the object is actually acceptable.

On the other hand, if the object has a generally round outer diametric contour such as an external gear, an internal gear, or a sprocket and has been positioned in place exactly in the same way, even when the outer periphery of the object abuts a jig or the like and the object is thereby positioned precisely in place, a shift in orientation caused by the rotation of the object in the place cannot be controlled. Thus, the shift in rotational orientation of the object would lead to an inconsistency in position of the projected portions on the outer periphery even when the outer diametric portion of the object is pushed against the jig or the like to position the center of the object with accuracy. This inconsistency would cause the aforementioned output level of difference to increase, thereby making it rather difficult to properly determine whether a defect exists on the object.

As described above, the conventional defect detection method and apparatus of this type had a drawback of making it extremely difficult to determine whether a defect exists on the object, due to a shift in position of the placement or in rotational orientation of the object.

In addition, as is obvious from the aforementioned operation principle, it is necessary to prepare individual reference data and criteria for each size and shape of an inspected object of a different type in order to determine whether the object is acceptable. Thus, this raises such problems that the preparation is laborious and requires storage means having an increased capacity for storing a plurality of types of reference data and criteria.

The GO/NO-GO criteria are also affected by a shift in position of the placement and in rotational orientation of the object, and thus no reasonable guidance is available for determining the magnitude of the criteria. This raises a problem of making it difficult to provide criteria which allow a precise determination of whether the object is acceptable.

Furthermore, with the conventional apparatus of this type, it is commonly practiced that an inspected object is illuminated with light and then the reflected light is used for imaging the object to generate image data thereof. Thus, in some cases, depending on the relationship between the color of the inspected object and a background color, the apparatus would have a drawback of making it impossible to provide a sufficient contrast required for generating a binary image from the image information of the object.

Furthermore, shades or the like caused by ambient light have an effect on a determination of whether the object is acceptable. Thus, it is very difficult to always provide an optimum inspection environment.

SUMMARY OF THE INVENTION

It is therefore an object of the present invention to provide a defect detection method and system which eliminate the aforementioned drawbacks of the prior art, which always provides a correct determination of whether an object such as a gear or a sprocket is acceptable even with a shift in position of placement or in rotational orientation of the object, and which require no laborious preparation and facilitate the setting of GO/NO-GO criteria.

The present invention provides a method for detecting a defect on an object having projected portions formed in the same shape along an arc with a predetermined pitch. In particular, the present invention provides a method for detecting a defect on the projected portions of an object having the projected portions outside an arc such as an external gear or a sprocket. The method includes the steps of determining an arc circumscribing a tip of each projected portion of an inspected object, and extracting each overlapping region formed by an overlapping portion between an inner portion of a region defined by the arc and a cut-away portion of the object to determine an area of each overlapping region. The method further includes the steps of comparing an area of each of the overlapping regions with each other, and determining that no defect exists on the object if each area difference falls within a range of predetermined criteria, whereas determining that a defect exists on the object if the area difference exceeds the range of the predetermined criteria.

The size of each overlapping region formed by the inner portion of an arc circumscribing the tip of each projected portion of the inspected object and a cut-away portion of the object contains no information regarding the position of the object and is always constant irrespective of the position and rotational orientation of the object. Therefore, a determination of whether the object is acceptable by comparing the area of these overlapping regions with each other makes it possible to provide a precise determination whether the object is acceptable, irrespective of a shift in position or in rotational orientation of the inspected object.

If an anomaly such as a chipped portion has occurred on the tip of a projected portion, adjacent overlapping regions of the aforementioned overlapping regions are not separated from but integrated with each other, thereby considerably increasing the area of an overlapping region adjacent the chipped portion. More specifically, the area of the overlapping region is two times or more the area of a normal overlapping region. As such, the occurrence of an anomaly such as a chipped portion causes the area of an overlapping region to change significantly in a discontinuous manner. This makes it possible to set easily the criteria to be used for a determination of whether the object is acceptable as well as to detect positively a chipped portion or the like occurring on the tip of a projected portion.

Furthermore, the data to be used for a determination of whether the object is acceptable is extracted from the inspected object itself upon inspection of the object. This obviates the need of the pre-processing for generating reference data in advance using a good sample, thereby simplifying the preparation. In addition, the data to be used for a determination of whether the object is acceptable is extracted from the inspected object itself. This prevents the size and shape of the object from affecting the result of a determination of whether the object is acceptable. Moreover, this obviates the need of setting reference data and criteria by the type of inspected objects, thereby making it unnecessary to use a high-capacity storage means for storing these data.

The present invention provides a system for detecting a defect on an object having projected portions formed in the same shape along an arc with a predetermined pitch. In particular, the present invention provides a system for detecting a defect on projected portions of an object having the projected portions outside an arc such as an external gear or a sprocket. The system includes imaging means for imaging the inspected object, and image capture means for holding an picked-up image as digital data. The system also includes region area detection means for analyzing the digital data held by the image capture means to determine an arc circumscribing a tip of each of the projected portion of the object, and then extracting each overlapping region formed by an overlapping portion between an inner portion of a region defined by the arc and a cut-away portion of the object to determine an area of each overlapping region. The system further includes region area comparison means for comparing an area of each overlapping region determined by the region area detection means with each other to determine an area difference, and defect determination means for determining that no defect exists on the object if the area difference determined by the region area comparison means falls within a range of predetermined criteria, whereas determining that a defect exists on the object if the area difference exceeds the range of the predetermined criteria.

With this configuration, the inspected object is imaged with the imaging means and then the digital data of the resulting image is held by means of the image capture means.

Then, the region area detection means analyzes the digital data held by the image capture means to determine an arc circumscribing the tip of each of the projected portion of the object, and then extracts each overlapping region formed by an overlapping portion between an inner portion of a region defined by the arc and a cut-away portion of the object to determine an area of each overlapping region.

The region area comparison means compares an area of each overlapping region determined by the region area detection means with each other to determine an area difference. Finally, the defect determination means outputs the result of a determination indicative of the absence of defects if the area difference determined by the region area comparison means falls within a range of predetermined criteria, whereas outputting the result of a determination indicative of the presence of a defect if the area difference exceeds the range of the predetermined criteria.

The present invention also provides a method for detecting a defect on an object having projected portions inside an arc such as an internal gear, the method including the following steps to achieve the aforementioned object. That is, the method includes the steps of determining an arc inscribing a tip of each projected portion of an inspected object, and extracting each overlapping region formed by an overlapping portion between an outer portion of a region defined by the arc and a cut-away portion of the object to determine an area of each overlapping region. The method also includes the steps of comparing an area of each of the overlapping regions with each other, and determining that no defect exists on the object if each area difference falls within a range of predetermined criteria, whereas determining that a defect exists on the object if the area difference exceeds the range of the predetermined criteria.

As such, the method for detecting a defect on an object having projected portions inside an arc includes the step of comparing overlapping regions with each other, each overlapping region being formed by an overlapping portion between an outer portion of a region defined by the arc inscribing the tip of each projected portion and a cut-away portion of the object. Other points are the same as those of the method for detecting a defect on an object having projected portions outside an arc.

In addition, the present invention also provides a system for detecting a defect on an object having projected portions inside an arc such as an internal gear. This system allows region area detection means to extract each overlapping region formed by an overlapping portion between an outer portion of a region defined by the arc inscribing the projected portions and a cut-away portion of the object to determine an area of each overlapping region and compare the values with each other.

Other points are the same as those of the system for detecting a defect on an object having projected portions outside an arc.

Furthermore, these defect detection systems further include a lighting box for placing the inspected object thereon, and the imaging means is arranged opposite to the illuminating surface of the lighting box, thereby providing a sufficient contrast required for image processing.

In this case, the contour of the inspected object is detected through a determination of whether the transmitted light from the lighting box is blocked. This makes it possible to precisely image the contour of the inspected object irrespective of the color of the object or the effect of ambient light.

In addition, the imaging means of these defect detection systems can be provided with a band pass filter for eliminating, as deleterious light, light having wavelengths other than those of light for the lighting box to illuminate the object with.

This ensures the elimination of the effect exerted by the intensity of ambient light and the effect of shades produced thereby.

The nature, principle, and utility of the invention will become more apparent from the following detailed description when read in conjunction with the accompanying drawings.

DETAILED DESCRIPTION OF THE PREFERRED EMBODIMENTS

Figure 1:
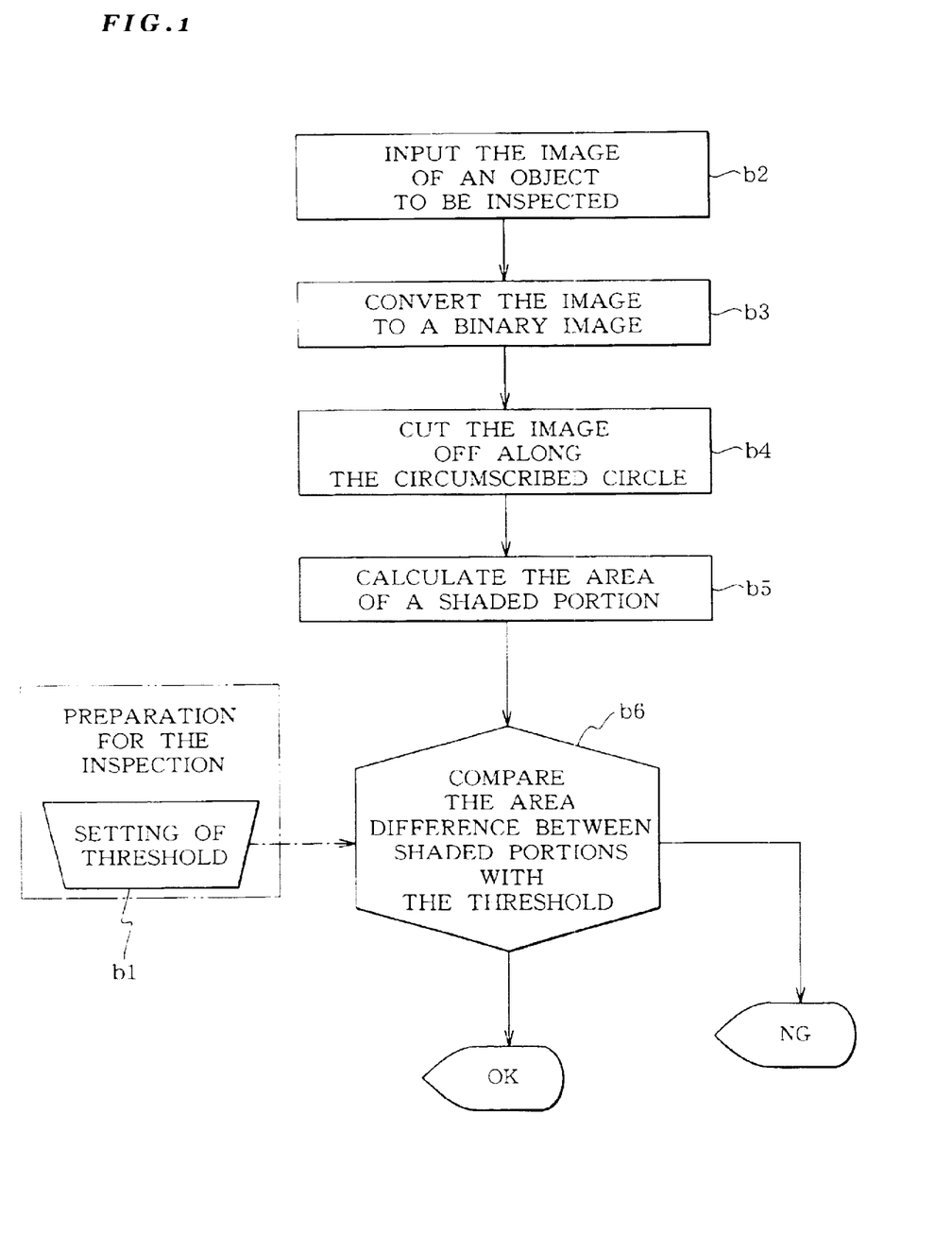
FIG. 1 is a schematic conceptual view simply illustrating the processing procedure of a defect detection method according to an embodiment of the present invention.

Embodiments of the present invention will be explained below with reference to the accompanying drawings. FIG. 1 is a schematic conceptual view illustrating the flow of the processing procedure of a defect detection method according to an embodiment of the present invention. In addition, FIGS. 2(a), (b) and FIGS. 3(a), (b) are views illustrating an operation principle according to the embodiment, showing the example of an inspection of a sprocket 1 manufactured by casting or sintering. There is such a problem encountered in manufacturing the sprocket 1 by casting or sintering that the tip of a module 1a or a projected portion is prone to chipping.

Figure 4:
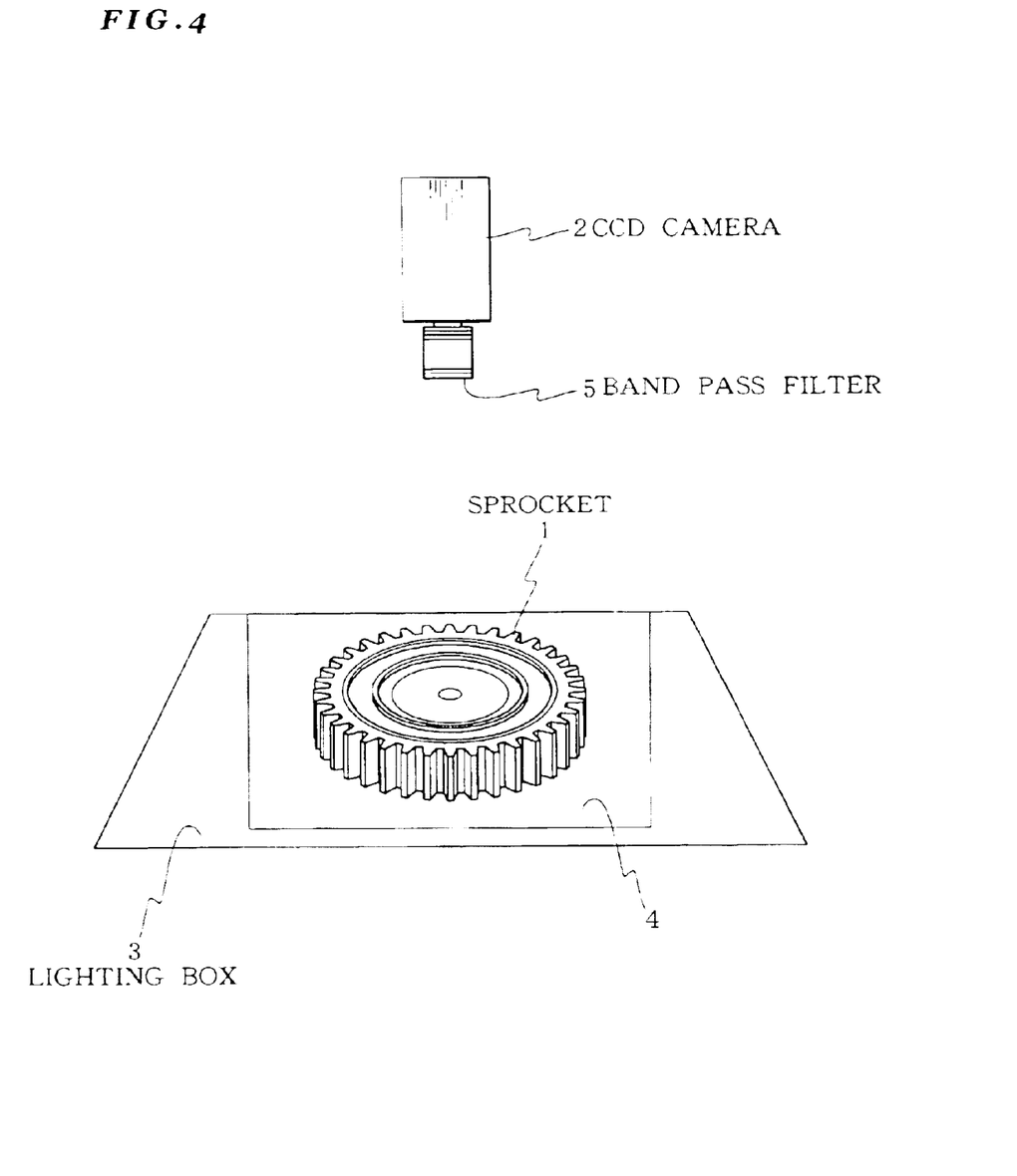
FIG. 4 is a schematic perspective view illustrating the imaging means and lighting box employed in the embodiment.

Here, for example, a CCD camera 2 shown in FIG. 4 can be employed as imaging means for imaging the sprocket 1 to be inspected. A lighting box 3 is used to place the inspected sprocket 1 thereon and desirably provided on the illuminating surface thereof with a diffuser 4 for diffusing output light to make the light intensity uniform within a predetermined range of the surface. On the other hand, the imaging lens of the CCD camera 2, arranged opposite to the illuminating surface of the lighting box 3, is provided with a band pass filter 5 and a hood (not shown) for shielding disturbance light. Here, the band pass filter 5 serves to transmit the light from the lighting box 3 while cutting most wavelengths of ambient light such as daylight and light from fluorescent or incandescent lamps.

Figure 5:
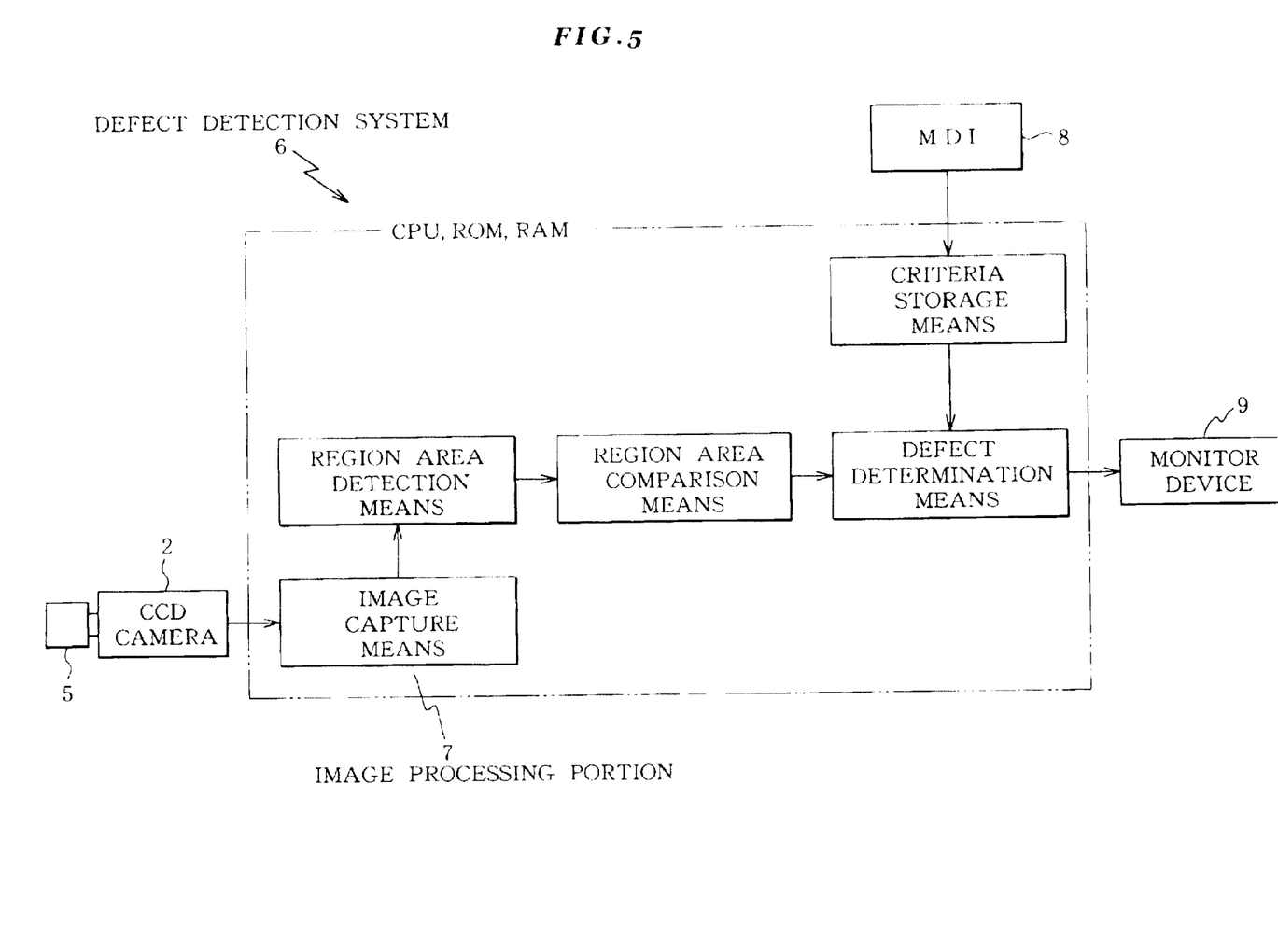
FIG. 5 is a schematic functional block diagram illustrating the configuration of a defect detection system employed in the embodiment.

FIG. 5 is a schematic functional block diagram illustrating the configuration of a defect detection system 6 employed in this embodiment. The main portion of the defect detection system 6 includes an image processing portion 7 for processing images picked up by the CCD camera 2, a manual data input portion 8 for setting GO/NO-GO criteria, and a monitor device 9 for displaying the final result of a determination of whether the object is acceptable for the operator to see the result.

The image processing portion 7, a type of controller constituted such as by a CPU, ROM, RAM, and nonvolatile memory, includes a frame memory employed as image capture means for holding the image data of the CCD camera 2, and criteria storage means for storing in a nonvolatile manner the criteria that has been set by the operator via the manual data input portion 8.

In addition, the ROM of the image processing portion 7 has a control program or function implementation means installed therein for accomplishing each function of the following means. The program accomplishes the function of region area detection means for analyzing image data in the frame memory to determine the arc circumscribing the modules 1a, or the projected portions of the sprocket 1, and determine the area of an overlapping region where the inner portion of the arc overlaps with cut-away portions of the sprocket 1. The program also accomplishes the function of region area comparison means for comparing with each other the area of each of the overlapping regions determined by the region area detection means to determine differences in area. The program further accomplishes the function of defect determination means for comparing the resulting area difference with the criteria to finally determine whether the object is acceptable.

To determine whether the sprocket 1 is acceptable with the defect detection system 6 described above, the operator sets in advance the criteria of a certain magnitude, which is considered suitable for the determination of whether the sprocket 1 is acceptable, to the criteria storage means of the image processing portion 7 via the manual data input portion 8 (step b1 of FIG. 1).

Figure 3A:
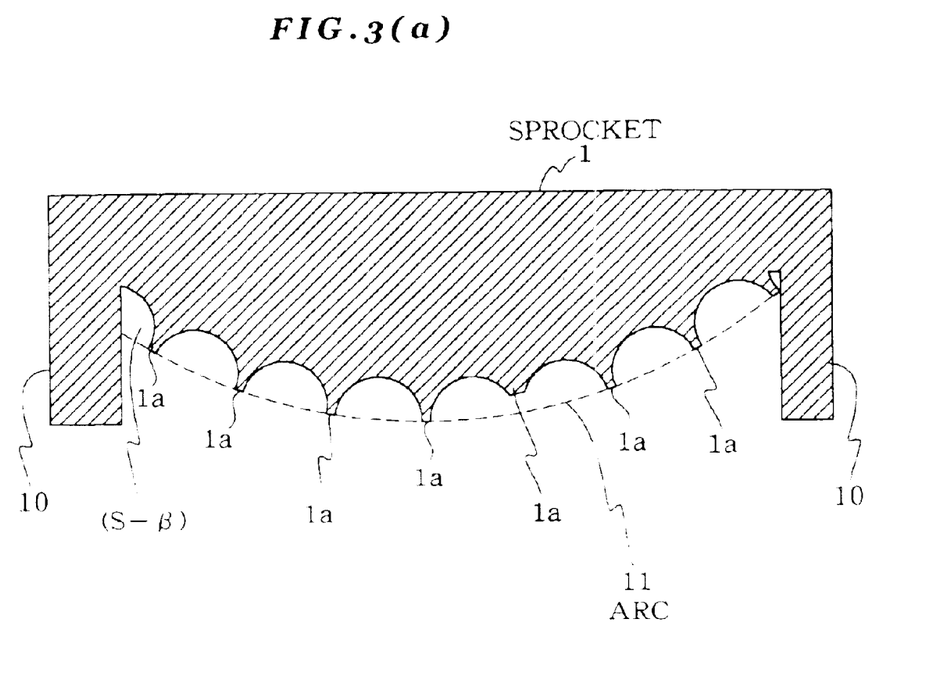
FIGS. 3(a) and (b) are views illustrating the operation principle of the defect detection method according to the embodiment, FIG. 3(a) being a conceptual view showing a sprocket having some defects with the image thereof being captured, FIG. 3(b) being the conceptual view with overlapping regions being extracted.
Figure 3B:
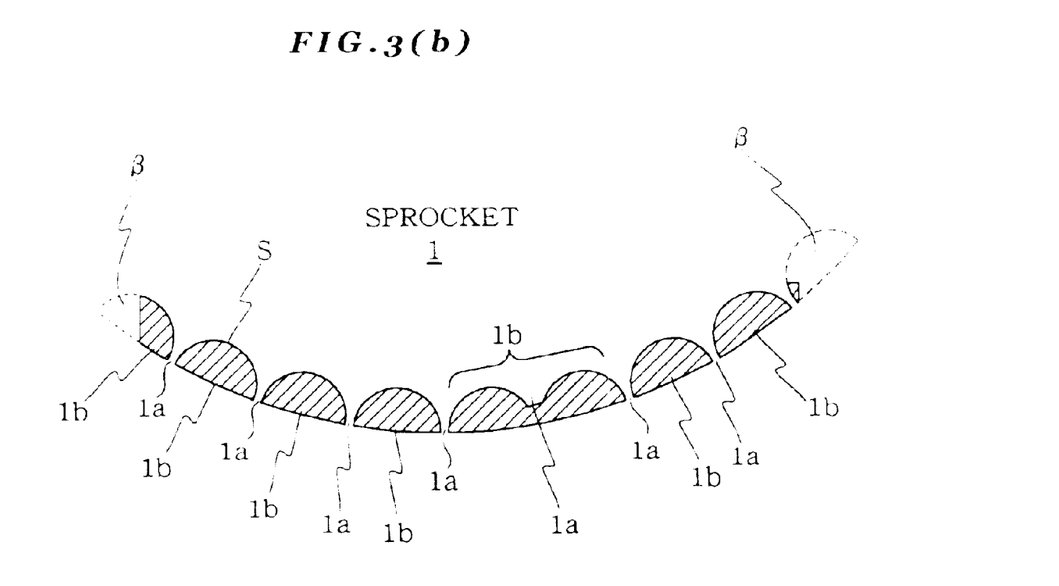

What becomes a problem at this point is the magnitude of the criteria. In this embodiment, for example, if a chipped portion exists on the tip of a module 1a of the sprocket 1 as shown in FIG. 3(b), of the overlapping regions 1b where the arc circumscribing the modules 1a of the sprocket 1 and the cut-away portions of the sprocket 1 overlap each other, the two overlapping regions 1b located on both sides of the module 1a with the chipped portion are integrated with each other to form one overlapping region 1b, the area of which is thereby discontinuously increased. As can be seen clearly from FIG. 3(b), the area of this portion is two times or more the area of an overlapping region 1b having a normal module 1a.

The final determination of whether the sprocket 1 is acceptable is carried out in accordance with the area difference of the overlapping regions 1b, that is, based on an absolute value provided by subtracting the area of an overlapping region 1b from that of another overlapping region 1b. Thus, for example, a value comparable to the area of a normal overlapping region 1b may be set to the GO/NO-GO criteria.

Let S be the area of a normal overlapping region 1b having no chipped portion on the module 1a. Then, the area of the overlapping region 1b is $2S+\alpha$ with a chipped portion having a size equal to area a on the tip of the module 1a, and the area difference between the two, $|(2S+\alpha)-S|$ or $|S-(2S+\alpha)|$, is always greater than S.

Accordingly, in this embodiment, all that is needed is to set as criteria a value equal to the area of a normal overlapping region 1b in order to make it possible to positively detect a chipped portion on the tip of the module 1a. Thus, there is no ambiguity in the setting of criteria.

When it is determined whether a newly manufactured sprocket 1 is acceptable, as exemplified in FIG. 4, first, the inspected sprocket 1 is placed on the lighting box 3 and then the lighting box 3 is lit up. Subsequently, the image of the sprocket 1 is picked up with the CCD camera 2 vertically from above and then the resulting image data is captured into the frame memory or the image capture means of the image processing portion 7 (step b2 of FIG. 1).

Figure 2A:
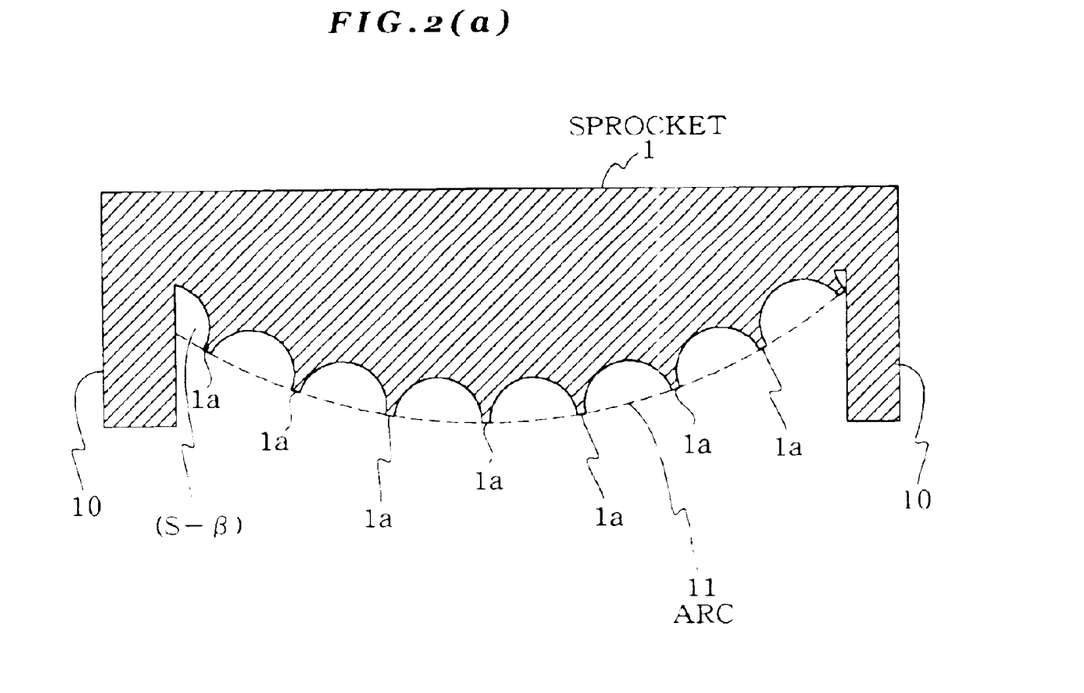
FIGS. 2(a) and (b) are views illustrating the operation principle of the defect detection method according to the embodiment, FIG. 2(a) being a conceptual view showing a sprocket having no defect with the image thereof being captured, FIG. 2(b) being the conceptual view with overlapping regions being extracted.

Then, the image data is turned to binary data through the usual gray scale thresholding to provide digital data corresponding to the image of the sprocket 1 (step b3 of FIG. 1). Here, FIG. 2(a) illustrates an example of normal data of the module 1a of the sprocket 1 having no chipped portion, while FIG. 3(a) illustrates an example of data of some defective modules 1a having chipped portions.

As described above, the CCD camera 2 makes use of the transmitted light from the lighting box 3 to pick up an image, thereby making it possible to provide a higher contrast than a conventional one that makes use of reflected light. In addition, the band pass filter 5 is used to eliminate thoroughly the effect of ambient light, thereby making it possible to provide proper data of a binary image without noise through simple gray scale thresholding as shown in FIG. 2(a) and FIG. 3(a). Incidentally, the rectangular shaded portions found on both sides of the sprocket 1 in FIG. 2(a) and FIG. 3(a) come from a jig 10 that is used to set the sprocket 1 onto the lighting box 3.

Then, the region area detection means of the image processing portion 7 is activated to analyze the digital data in the frame memory. An arc 11 which circumscribes those multiple modules 1a is then determined. Then, extracted are multiple overlapping regions 1b where the inner regions defined by the arc 11 and the cut-away portions of the sprocket 1 overlap with each other (step b4 of FIG. 1). Then, determined is the area of each overlapping region 1b, that is, the area of each semi-circular shaded portion, as shown in FIG. 2(b) or FIG. 3(b) (step b5 of FIG. 1).

As described above, the two overlapping regions 1b located on both sides of the module 1a with a chipped portion are integrated with each other to form one overlapping region 1b as shown in FIG. 3(b), thereby making the area of the two regions two times or more the area of the overlapping region 1b having a normal overlapping region 1b.

Then, the region area comparison means and the defect determination means of the image processing portion 7 are activated to compare the area of each overlapping region 1b with each other and thereby determine each area difference between the overlapping regions 1b. It is then determined that the sprocket 1 has no defect when the area differences fall within the range of the pre-set criteria, whereas it is determined that the sprocket 1 has defects when the area differences exceed the range of the criteria (step b6 of FIG. 1). Then, the result of the determination is outputted to the monitor device 9.

Figure 2B:
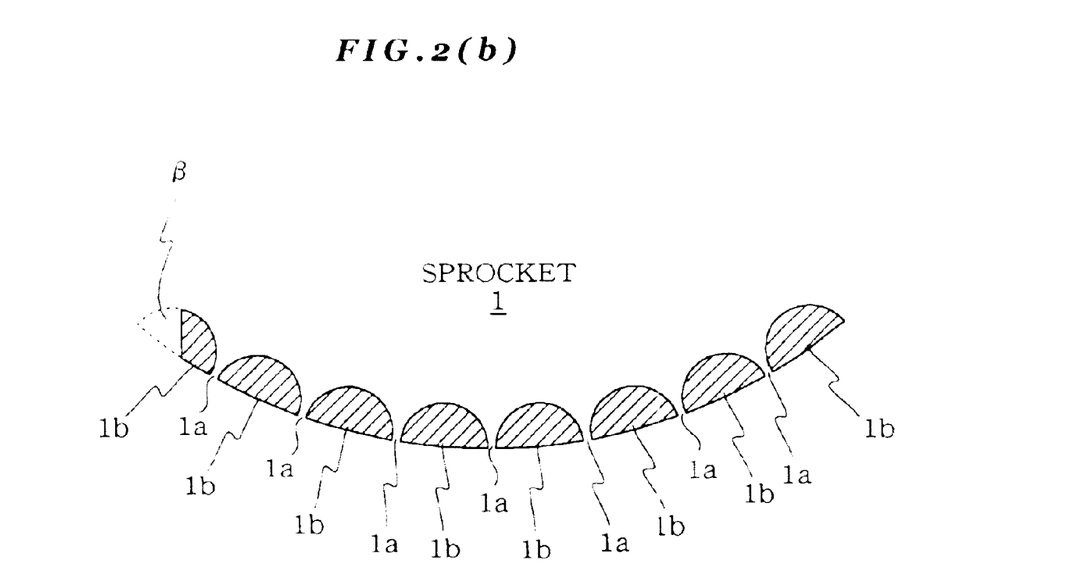

Consequently, in the example shown in FIG. 2(b), it is determined that the sprocket 1 is acceptable since almost no area differences exist between the overlapping regions 1b. On the other hand, in the example of FIG. 3(b), there exists an overlapping region 1b having a large area where two overlapping regions 1b are joined to each other through a chipped portion on the tip of the module 1a. The area difference between the joined overlapping region 1b and another overlapping region 1b having a normal size of area exceeds 100% of the area of the normal overlapping region 1b, thereby allowing the result that the sprocket 1 is rejectable to be outputted.

Here, in the example shown in FIG. 2(a) or FIG. 3(a), the jig 10 is used to secure both sides of the sprocket 1. In this case, the area of the overlapping region 1b interfering with a shade of the jig 10, that is, the area of the overlapping regions 1b located on both right and left sides may be detected to be smaller irrespective of the presence or absence of a defect in the module 1a.

In this regard, as shown in FIG. 3(b), let S be the area of a normal overlapping region 1b and β be the area of the portion where the jig 10 interferes with the overlapping regions 1b on both right and left sides. Then, the difference between the area of the overlapping region 1b located on both right and left sides (S−β) and the area S of another normal overlapping region 1b, |(S−β)−S| or |S−(S−β)|, is β. Since β falls within the range of 0<β<S, the area difference is always smaller than the area S of a normal overlapping region 1b. In other words, no defect can be detected in the portion where the jig 10 interferes with the overlapping region 1b on both right and left sides.

Therefore, the GO/NO-GO criteria can be set to a value equal to the area of a normal overlapping region 1b. Even when part of the overlapping region 1b overlaps with the jig 10, this will makes it possible to provide a proper determination of whether the sprocket 1 is acceptable without any error in the determination caused by the interference with the jig 10. That is, it is totally unnecessary for the operator to pay attention to the position of placement or the orientation of the sprocket 1 as well as the interference with the jig 10.

Furthermore, not only a sprocket 1 in an ordinary shape, along the entire circumference of which modules 1a are formed, but also a sprocket 1 in a special shape that allows modules 1a to be formed on the outer periphery of the arc of a sector-shaped mechanical element can be determined properly by placing shield plates on both sides of the sprocket 1 to mask the light from the lighting box 3. The data of the overlapping regions to be extracted in this case is qualitatively equal to those of FIG. 2(b) or FIG. 3(b).

On the other hand, suppose the sprocket 1 having modules 1a formed along the entire outer periphery thereof is generally imaged, that is, the sprocket 1 has generally a circular contour and the entire image thereof is completely accommodated within the view field of the CCD camera 2 without using the jig 10. In this case, such a phenomenon will not occur that a smaller area is detected than the actual area of a normal overlapping region 1b. Therefore, no problem will be raised even when the value of criteria is so set as to be considerably smaller than the area of a normal overlapping region 1b. In this case, setting the value of criteria to a sufficiently small one will make it possible to detect not only a chipped portion on the tip of the module 1a but also anomalies such as burrs or chipped portions in the valley thereof.

Figure 6:
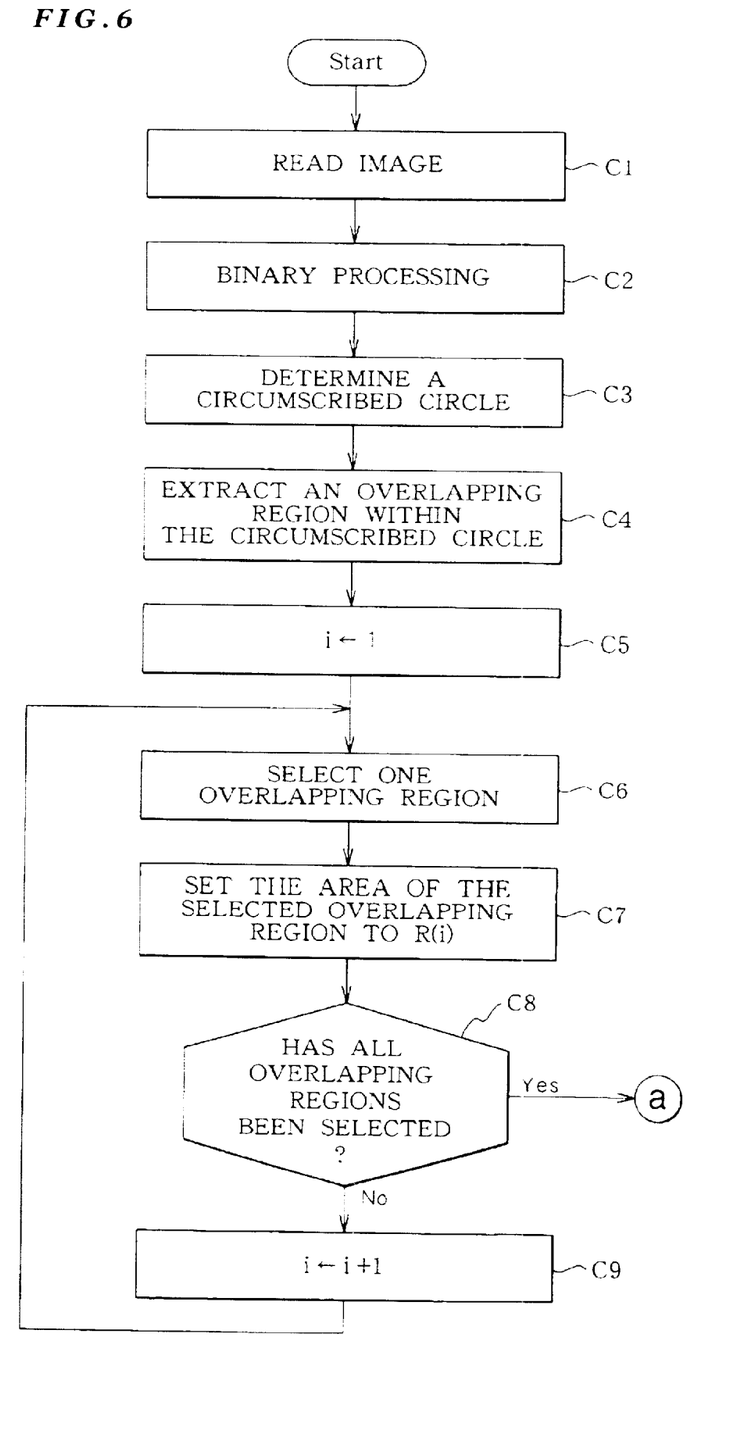
FIG. 6 is a flowchart showing specifically the processing operation of the defect detection system according to the embodiment.
Figure 7:
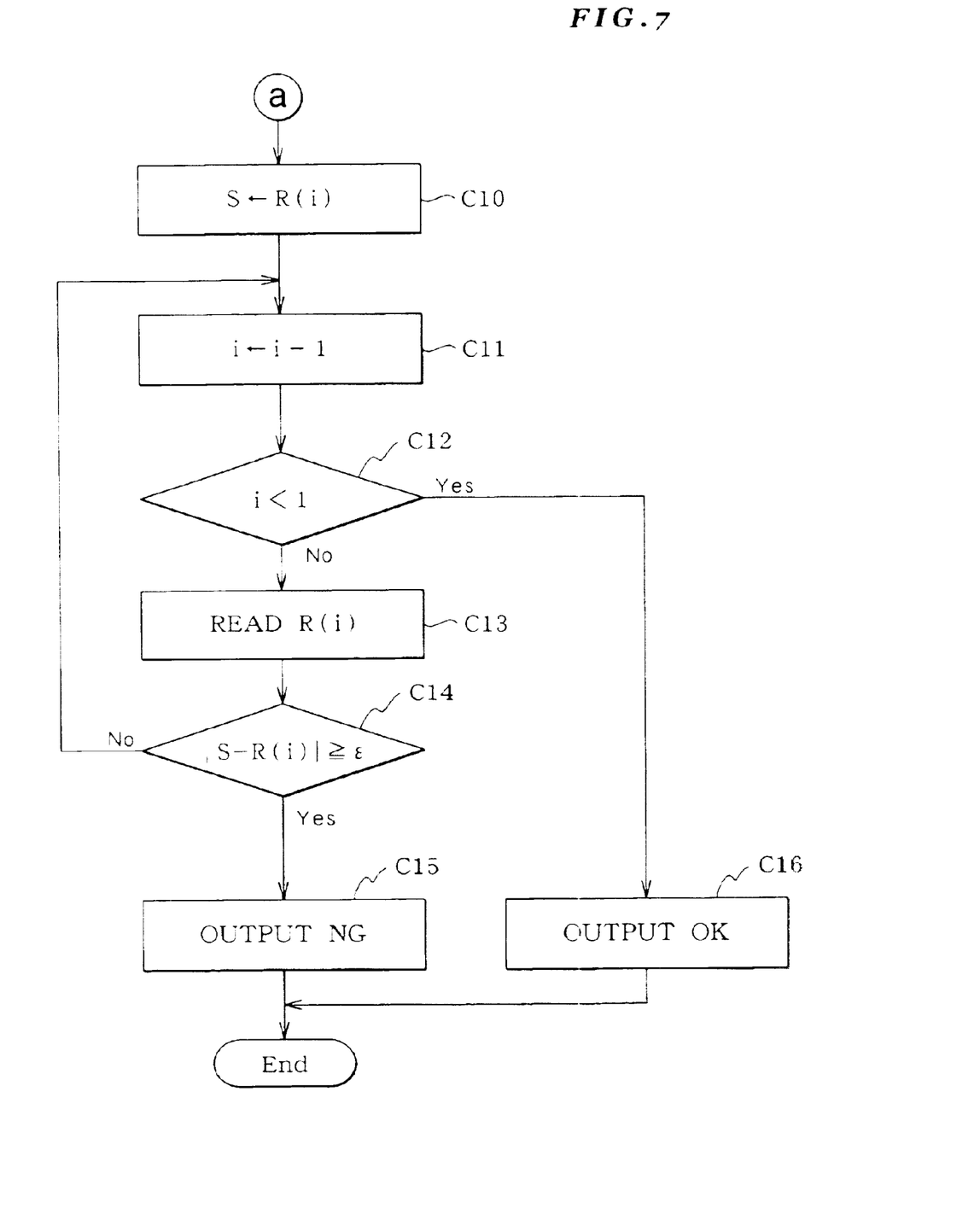
FIG. 7 is a continuation of the flowchart showing specifically the processing operation of the defect detection system according to the embodiment.

Now, the processing operation of the defect detection system 6 according to this embodiment will be explained specifically with reference to the flowchart of FIGS. 6 and 7.

First, the operator turns on the power of the lighting box 3 and puts a sprocket 1 to be inspected onto the lighting box 3. Then, the operator turns on the start switch of the defect detection system 6, and thereby the CPU of the image processing portion 7 (hereinafter simply referred to as the CPU) initiates the processing operation in accordance with the control program of the ROM.

First, the CPU outputs a command of snap shot to the CCD camera 2 or the imaging means to allow the CCD camera 2 to pick up the image of the sprocket 1, and then reads the resulting image data to the frame memory or the image capture means (step c1).

Then, the CPU performs the usual gray scale thresholding on the image data to generate the image in two levels of gray scale, thereby providing the resulting digital data corresponding to the image of the sprocket 1 (step c2).

Then, the CPU or the region area detection means analyzes the digital data to determine the arc 11 circumscribing the multiple modules 1a of the sprocket 1 as shown in FIG. 2(a) or FIG. 3(a) (step c3). Then, the CPU extracts the multiple overlapping regions 1b formed by the portion where the inner region defined by the arc 11 overlaps with the cut-away portion of the sprocket 1 (step c4).

Examples of the extracted overlapping regions 1b are illustrated in FIG. 2(b) and FIG. 3(b). As described above, FIG. 2(a) illustrates an example of a normal sprocket 1 having no defect, while FIG. 3(a) illustrates an example of a sprocket 1 with some modules 1a having a defect.

Then, the CPU or the region area detection means resets the value of index i to one (step c5) and then selects one overlapping region 1b from the extracted data shown in FIG. 2(b) or FIG. 3(b) to determine the area of the overlapping region 1b (step c6). The CPU then temporarily stores the value of the resulting area in an area storage register R(i) corresponding to the value of index i (step c7).

Then, the CPU or the region area detection means determines whether selection processing has been performed on all overlapping regions 1b selected by the processing in step c4 (step c8). If any one of the overlapping regions 1b has not been selected, the value of index i is incremented by one (step c9). Then, in the same manner described above, the processing is repeatedly executed in which the following overlapping region 1b is selected to determine the area thereof and the value of the area is temporarily stored in an area storage register R(i) corresponding to the value of index i (steps c6 to c9).

Then, such processing is repeatedly executed to thereby select all overlapping regions 1b and store the area of each of the regions in the area storage register R(i). Thereafter, the CPU or the region area detection means exits from this loop processing.

Incidentally, the example of FIG. 2(b) has eight overlapping regions 1b and therefore provides eight to the final value of index i, while the example of FIG. 3(b) has seven overlapping regions 1b and therefore provides seven to the final value of index i.

Then, the CPU or the region area comparison means stores temporarily in the reference area storage register S the value of area stored in the area storage register R(i) corresponding to the current value of index i, that is, the value of area of the overlapping region 1b that has been read most recently in the aforementioned loop processing (step c10). Then, the CPU decrements the value of index i by one (step c11) and then determines whether the current value of the index i is less than the initial value of 1, that is, the comparison processing has been completely performed between the area of the overlapping region 1b that has been read most recently and the area of each of the other overlapping regions 1b excluding the former one (step c12).

Then, if the value of index i is not less than the initial value of 1 and the comparison processing has not yet been completed, the CPU or the region area comparison means reads newly the value of the area of an overlapping region 1b corresponding to the current value of index i (step c13). Then, the CPU calculates the difference between the area and the one stored in the reference area storage register S to determine whether the area difference falls within the range of criteria ε stored previously in the nonvolatile memory employed as the criteria storage means, for example, within 100% of a normal overlapping region 1b (step c14).

If the area difference between the reference area storage register S and the area storage register R(i) falls within the range of criteria ε, the CPU or the region area comparison means decrements the value of index i by one to perform again the determination processing on the current value of index i. Then, in the same manner as described above, the CPU reads newly the value of the area storage register R(i) corresponding to the current value of index i to calculate the area difference between the value and the reference area storage register S and then repeats a determination of whether the area difference falls within the range of criteria ϵ (steps c1 to c14).

Suppose the determination of step c12 has become true while such processing is repeatedly executed, that is, all area differences between the overlapping region 1b that has been most recently read and each of the other overlapping regions 1b have been found to fall within the range of criteria ϵ. In this case, the CPU or the defect determination means determines that there is no defect on the tip of all modules 1a of the sprocket 1 and then outputs a signal indicative of the absence of defects to the monitor device 9 (step c16). The monitor device 9 receives the signal and then displays that the sprocket 1 is acceptable so that the operator can see the display.

In the example of FIG. 2(b), depending on the order of reading the area data in the aforementioned processing of step c7, it is possible that the value of area of an overlapping region 1b having a normal size is stored and a value of area smaller than a normal one, caused by the interference with the jig 10, is stored in the reference area storage register S. However, even when any value has been defined as the reference area S, it will never happen that the area difference between another overlapping region 1b and the reference area S exceeds 100% of the normal value, whereby it is determined that the sprocket 1 is acceptable. Therefore, any order of reading the area data in the aforementioned step c7 provides the data of FIG. 2(b) with the determination that the sprocket 1 is acceptable.

On the other hand, suppose the determination of step c14 has become true while the processing in steps c11 to c14 is repeatedly executed, that is, any one of the area differences between the overlapping region 1b that has been most recently read and each of the other overlapping regions 1b has been found to exceed the range of criteria ϵ. In this case, the CPU or the defect determination means determines that there is a defect on the tip of at least one or more modules 1a and then outputs a signal indicative of the presence of defects to the monitor device 9 (step c15). The monitor device 9 receives the signal and then displays that the sprocket 1 is rejectable so that the operator can see the display.

In the example of FIG. 3(b), depending on the order of reading the area data in the aforementioned processing of step c7, it is possible that the value of area of an overlapping region 1b having a normal size is stored, a value of area smaller than a normal one, caused by the interference with the jig 10, is stored, and a value of area of a overlapping region 1b greater than a normal one, caused by mutually joined overlapping regions 1b resulted from a chipped portion on the tip of the module 1a, is stored in the reference area storage register S.

If the value of area of an overlapping region 1b having a normal size is stored as the reference area S, the area difference between the overlapping region 1b which is made greater than the normal value due to the mutually joined overlapping regions 1b caused by the chipped portion on the tip of the module 1a and the reference area S exceeds 100% of the normal value. On the other hand, if the value of area of the overlapping region 1b smaller than the normal value, resulted from the interference with the jig 10, is stored as the reference area S, the area difference between the overlapping region 1b which is made greater than the normal value due to the mutually joined overlapping regions 1b caused by the chipped portion on the tip of the module 1a and the reference area S exceeds 100% of the normal value. Furthermore, if the value of area of the overlapping region 1b which is made greater than the normal value due to the mutually joined overlapping regions 1b caused by the chipped portion on the tip of the module 1a is stored as the reference area S, the area difference between the overlapping region 1b having the normal size and the reference area S exceeds 100% of the normal value. In addition, the area difference between the overlapping region 1b made smaller than the normal value, resulted from the interference with the jig 10, and the reference area S also exceeds 100% of the normal value. Therefore, any order of reading the area data in the aforementioned step c7 always provides the data of FIG. 3(b) with the determination that the sprocket 1 is rejectable.

As described above, as an embodiment, such an example has been described in which the criteria ϵ is set in advance by the operator. However, the value of criteria ϵ needs not necessarily be set manually at the stage of preparation and may be automatically generated through internal processing of the CPU at the stage of inspecting the sprocket 1. Now, the processing for automatically generating the criteria ϵ will be explained briefly.

At the stage where the determination of step c8 has become true through the aforementioned processing of the CPU, all area data of the overlapping regions 1b is stored in each area storage register R(i). Therefore, in principle, all the values in the area storage register R(i) may be added together at this stage to determine an average which is employed as the criteria ϵ.

However, since the jig 10 may be often used to roughly position the sprocket 1 in practice, there is a high possibility that the value of areas of the overlapping regions 1b on both sides of the sprocket 1, smaller than the actual value, is stored in the area storage register R(i). Therefore, by employing the conventionally known sorting processing, the two values of the area storage register R(i), having least values, are not included in the calculation of the average. In addition, in the case of the presence of a chipped portion on the tip of a module 1a, a value of area considerably greater than the normal value is stored in the area storage register R(i). Accordingly, n values of the area storage register R(i), having greatest values, are excluded from the calculation of the average according to the probability of occurrence of chipped portions of a module 1a by employing the conventionally known sorting processing. Usually, it is hardly conceivable that two or more chipped portions occur in one sprocket 1. Thus, the greatest value of the area storage register R(i) may be excluded from the calculation of the average by letting n=1 in practice.

As such, the two area storage registers R(i) having least values and the area storage register R(i) having the greatest value are excluded to determine the total sum of the area storage register R(i). Then, the resulting value is divided by (the final value of i–2–n) to determine the value of area of a normal overlapping region 1b and thus the resulting value may employed as the criteria ϵ.

Such processing can be performed at the point where the determination of step c8 has become true to generate automatically the value of criteria ϵ, thereby making it possible to completely eliminate the preparation shown in step b1 of FIG. 1.

Described above have been the processing procedures for detecting defects in an object having projected portions on the outer periphery of an arc thereof and the implementation means of a substantial apparatus. However, by applying the same processing procedures and implementation means as those described above, it is also possible to detect a defect of an object such as an internal gear having modules on the inner periphery of an arc thereof. In this case, an arc inscribing the tip of the projected portions of the modules or the like may be determined, and then each overlapping region formed by the overlapping portion between the outer portion of a region defined by this arc and the cut-away portion of the object may be extracted to determine area differences between the overlapping regions. Then, the processing operation may be performed in the same manner as described above. In this regard, the difference in the modification can be accomplished readily from the aforementioned embodiment and therefore will not be explained in more detail.

Incidentally, upon determination of an overlapping portion between the outer portion of a region defined by an arc and a cut-away portion of an internal gear or the like having modules on the inner periphery of the arc, such a problem is presented that scanning across the outer region beyond the outer diameter of the internal gear may cause the highlighted region of the lighting box 3 surrounding the internal gear to be detected as an overlapping region of the cut-away portion of the object. In this case, a masking plate provided with a concentric circle having a diameter greater than the aforementioned arc and not exceeding the outer diameter of the object has to be placed on the lighting box 3. Alternatively, a masking layer having the same function as this has to be generated in a software-wise manner to prohibit an unnecessary portion of the image from being captured.

The defect detection method and system according to the present invention are to evaluate the area of cut-away portions formed between the projected portions of an object irrespective of the position or rotational orientation of the inspected object and thereby determine whether the shape of the tip of the projected portions is acceptable. Accordingly, it is made possible to determine precisely chipped portions on the tip of the projected portions, formed on the outer or inner periphery of the object, irrespective of a shift in position or in rotational orientation of the object to be inspected.

Furthermore, the present invention is adapted to determine whether the object is acceptable by making use of area data which varies a great deal depending on the absence of a chipped portion on the tip of the projected portions. This makes it possible to set easily the criteria to be used for a determination of whether the object is acceptable.

In addition, the data to be used for a determination of whether the object is acceptable is extracted from the object to be inspected itself, thereby obviating the need of pre-processing for generating reference data in advance using a good sample. Moreover, it is also made unnecessary to store a quantity of reference data or criteria for each type of inspected objects, thereby considerably simplifying the pre-processing and the preparation, which have been conventionally required for the inspection of the object.

Furthermore, imaging means is arranged opposite to the lighting box on which the inspected object is placed and a band pass filter optimized to the wavelength of light with which the lighting box illuminates the object is implemented in the imaging means. This makes it possible to provide a contrast sufficient for image processing irrespective of the color of the object or the effect of ambient light, thereby allowing a defect to be detected precisely.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all change which come within the meaning and range of equivalency of the claims are therefore intended to be embraced therein.

The entire disclosure of Japanese Patent Application No. 2000-149546 (Filed on May 22, 2000) including specification, claims, drawings and summary are incorporated herein by reference in its entirety.

What is claimed is:

1. A method for detecting a defect on an object having a plurality of projected portions formed along an arc with a predetermined pitch, the projected portions being separated by a plurality of cut-away portions, the method comprising:

determining an arc circumscribing a tip of each projected portion of the object;

identifying a plurality of overlapping regions formed by an overlapping portion between an inner portion of a region defined by the arc and the plurality of cut-away portions, and determining an area corresponding to each of the overlapping regions;

comparing the area of each of the overlapping regions with the areas of the other overlapping regions to determine an area difference for each of the overlapping regions; and determining that no defect exists on the object when the area difference of each of the overlapping regions is within a range of predetermined criteria, and determining that a defect exists on the object when the area difference of at least one of the overlapping regions is outside the range of predetermined criteria.

2. A system for detecting a defect on an object having a plurality of projected portions formed along an arc with a predetermined pitch, the projected portions being separated by a plurality of cut-away portions, the system comprising:

an imager that images the object to be inspected;

an image memory that stores the image as digital data;

a region area detector that analyzes the digital data stored by the image capture system to determine an arc circumscribing a tip of each of the plurality of projected portions of the object, identifies a plurality of overlapping regions formed between an inner portion of a region defined by the arc and the plurality of cut-away portions, and determines an area of each of the overlapping regions;

a region area comparator that compares the area of each of the overlapping regions with the areas of each of the other overlapping regions and determines an area difference; and a defect determiner that determines that no defect exists on the object when the area difference of each of the overlapping regions is within a range of predetermined criteria, and determines that a defect exists on the object when the area difference of at least one of the overlapping regions is outside the range of predetermined criteria.

3. A method for detecting a defect on an object having a plurality of projected portions formed along an arc with a predetermined pitch, the projected portions being separated by a plurality of cut-away portions, the method comprising:

determining an arc circumscribing a tip of each projected portion of the object;

identifying a plurality of overlapping regions formed by an overlapping portion between an outer portion of a region defined by the arc and the plurality of cut-away portions, and determining an area of each of the overlapping regions;

comparing the area of each of the overlapping regions with the areas of the other overlapping regions to determine an area difference for each of the overlapping regions; and determining that no defect exists on the object when the area difference of each of the overlapping regions is within a range of predetermined criteria, and determining that a defect exists on the object when the area difference of at least one of the overlapping regions is outside the range of predetermined criteria.

4. A system for detecting a defect on an object having a plurality of projected portions formed along an arc with a predetermined pitch, the plurality of projected portions being separated by a plurality of cut-away portions, the system comprising:

an imager that images the object;

an image memory that stores the image as digital data;

a region area detector that analyzes the digital data stored by the image capture system to determine an arc circumscribing a tip of each of the plurality of projected portions of the object, identifies a plurality of overlapping regions formed between an outer portion of a region defined by the arc and a the plurality of cut-away portions, and determines an area corresponding to each of the plurality of overlapping regions;

a region area comparator that compares the area of each of the overlapping regions with the areas of each of the other overlapping regions and determines an area difference; and when the area difference of each of the overlapping regions is within a range of predetermined criteria, and determines that a defect exists on the object when the area difference of at least one of the overlapping regions is outside the range of predetermined criteria.

5. The system for detecting a defect on an object according to claim 2, further comprising a light box, on which the inspected object is placed, the imager being positioned opposite to an illuminating surface of the light box.

6. The system for detecting a defect on an object according to claim 5, wherein the imager comprises a band pass filter that filters out light having wavelengths other than the wavelengths of light used by the light box to illuminate the object.

7. The system for detecting a defect on an object according to claim 4, further comprising a light box, on which the inspected object is placed, the imager being positioned opposite to an illuminating surface of the light box.

8. The system for detecting a defect on an object according to claim 7, wherein the imager comprises a band pass filter that filters out light having wavelengths other than the wavelengths of light used by the light box to illuminate the object.

* * * * *